Feb. 25, 1964 D. G. LUDLUM 3,122,635
PORTABLE SCINTILLATION DETECTOR WITH A FLAT
LARGE AREA PROBE FOR SURFACE MONITORING
Filed Dec. 3, 1958 11 Sheets-Sheet 1

INVENTOR
D. G. LUDLUM

BY A. Yates Dowell
ATTORNEY

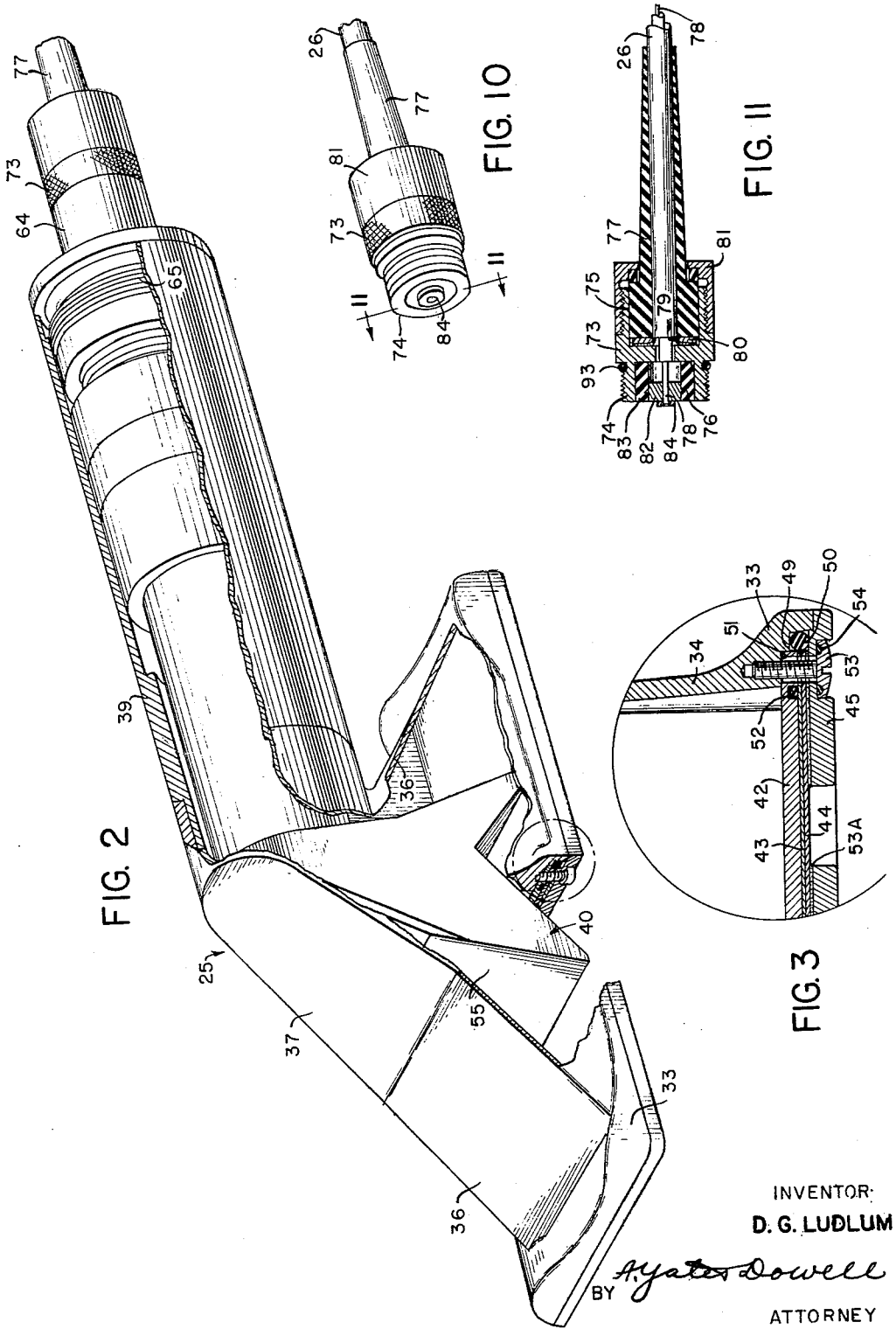

Feb. 25, 1964   D. G. LUDLUM   3,122,635
PORTABLE SCINTILLATION DETECTOR WITH A FLAT
LARGE AREA PROBE FOR SURFACE MONITORING
Filed Dec. 3, 1958   11 Sheets-Sheet 3

INVENTOR
D.G. LUDLUM
BY A. Yates Dowell
ATTORNEY

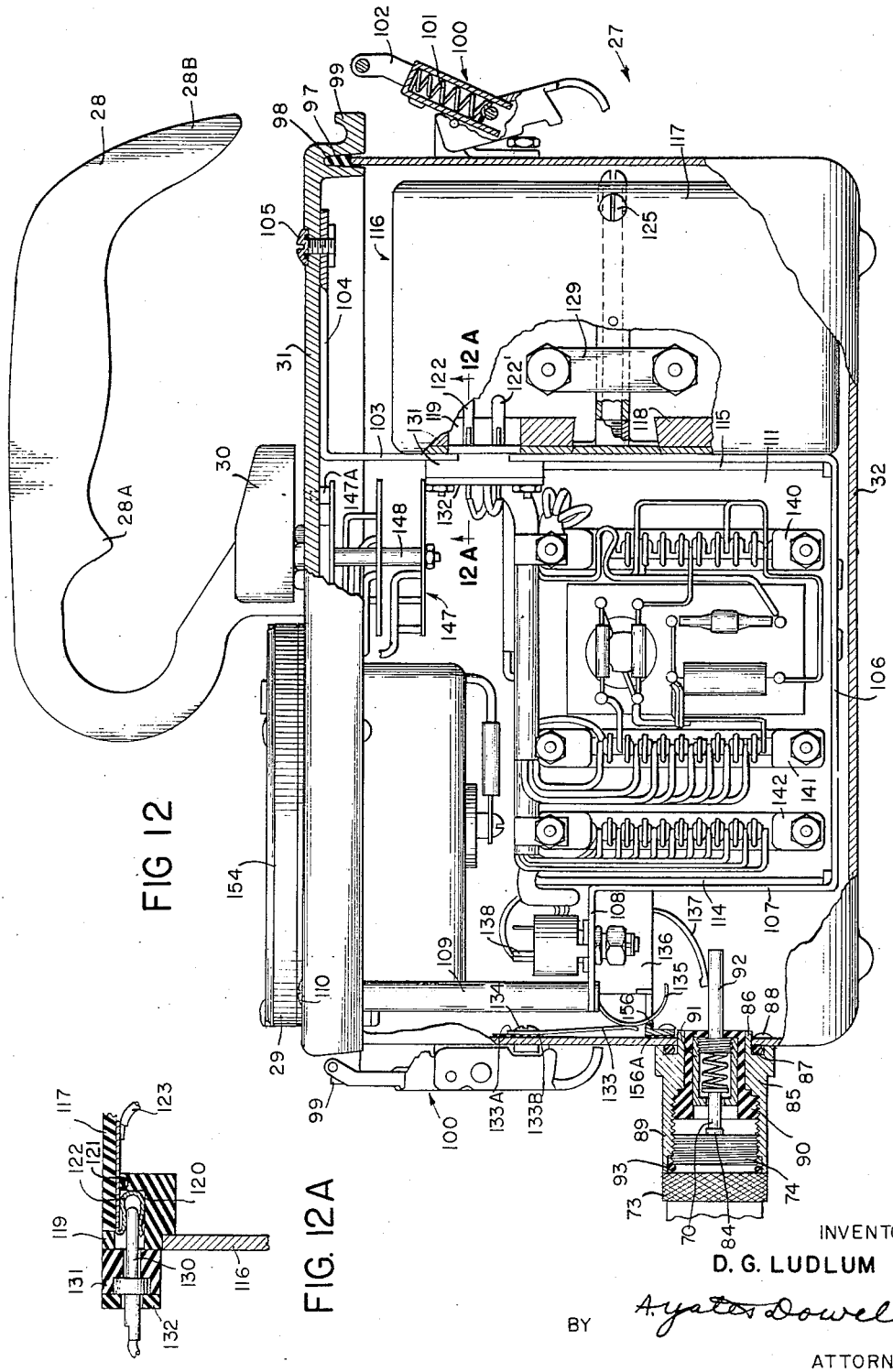

Feb. 25, 1964
D. G. LUDLUM
3,122,635
PORTABLE SCINTILLATION DETECTOR WITH A FLAT
LARGE AREA PROBE FOR SURFACE MONITORING
Filed Dec. 3, 1958
11 Sheets-Sheet 6
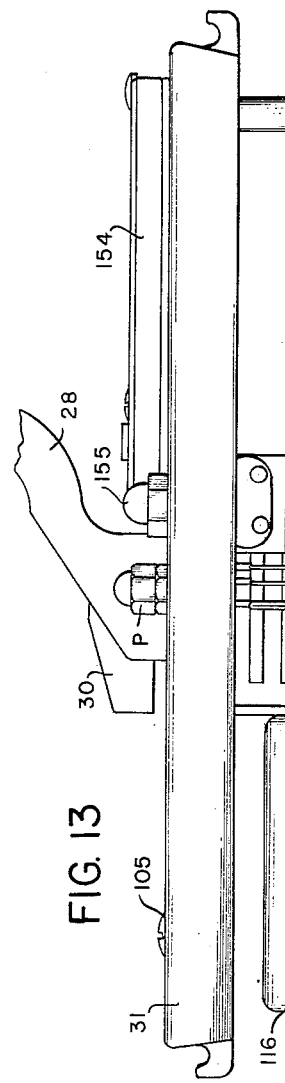
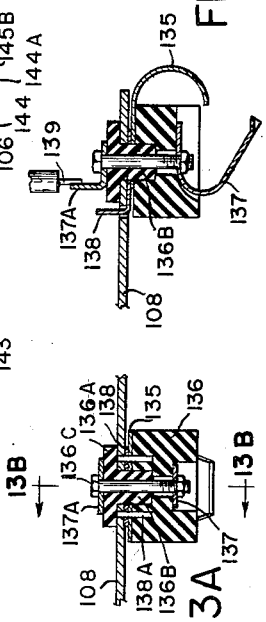
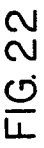
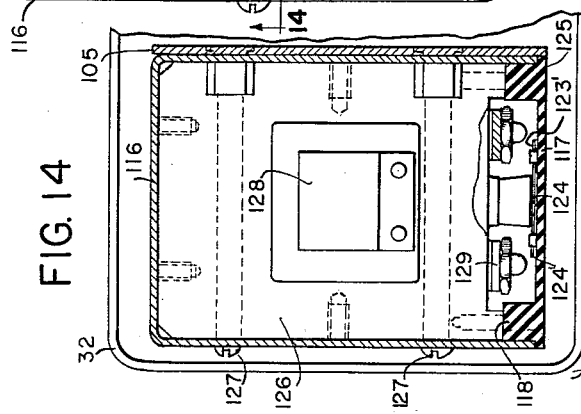
INVENTOR
D.G. LUDLUM
A. Yates Dowell
ATTORNEY INVENTOR
D. G. LUDLUM
BY *A. Yates Dowell*
ATTORNEY Feb. 25, 1964 D. G. LUDLUM 3,122,635
PORTABLE SCINTILLATION DETECTOR WITH A FLAT
LARGE AREA PROBE FOR SURFACE MONITORING
Filed Dec. 3, 1958 11 Sheets-Sheet 9

INVENTOR
D. G. LUDLUM
BY A. Yates Dowell
ATTORNEY

INVENTOR
D. G. LUDLUM
BY A. Yates Dowell
ATTORNEY

United States Patent Office 3,122,635
Patented Feb. 25, 1964

3,122,635
PORTABLE SCINTILLATION DETECTOR WITH A FLAT LARGE AREA PROBE FOR SURFACE MONITORING
Donald G. Ludlum, Santa Fe, N. Mex., assignor to Eberline Instrument Corporation, Santa Fe, N. Mex.
Filed Dec. 3, 1958, Ser. No. 777,899
10 Claims. (Cl. 250—71.5)

The present invention relates to radiation detection and more particularly to the scintillation type radiation detector for detecting alpha particles and determining the concentration thereof issuing from a source of radiation.

Heretofore various types of radiation detection devices have been employed for obtaining information based on the particles issuing from a source. Although radiation is effective to produce scintillation of a fluorescent material, the measurements of the radiation have not been accurate throughout the area of the probe head window because of the optical system required with previously known photomultiplier tubes which could not uniformly collect the scintillations. The probe heads have been unduly small and the detection work was extremely tedious.

Further, the previous detectors could not withstand great changes in temperature such as from $-40°$ F. to $+140°$ F. and remain operative and the previous equipment could not stand the shocks to which it might be exposed in modern warfare. Further, the previously known detectors were not capable of use over long periods of time without requiring substantial attention.

Also, because of the very weak penetrating effect of alpha particles it is essential to have the detector held very close to the radiation source, and since the window must be of minimum thickness damage to the window is frequently caused by obstructions which might be vegetation. The replacement of such windows was difficult and expensive.

Further, previously known detectors could become contaminated from the materials being investigated thereby producing inaccurate results.

An object of the present invention is to provide a scintillation detector which minimizes the inadequacies of the prior devices and to provide a structure which will have a long useful life with a minimum of upkeep or attention.

A further object is to provide a radiation detector which will withstand rough usage and wide variations in temperature and remain operative.

Another object is to provide a counting system for alpha particles which will count over a wide range with extreme accuracy.

A further object is to provide an optical system which will direct sources of light to a common point where the total amount of light can be measured so that the effect of a particular scintillation of light at one location will have substantially the same effect at the point of collection as a scintillation of light at another location.

Another object is to provide a detector which will have a minimum of thermal inertia to permit rapid return of the temperature of the detector to an operative range in the event the operative range of temperature is exceeded.

A further object is to provide a light collecting prism which collects light equally over an extended area concentrating such light at a particular location.

Another object is to provide an accurate detector of minimum weight and great strength and which will remain operative when subject to adverse conditions.

A further object is to provide a detector made of component parts which can be readily replaced and which can be assembled in only one correct relation.

Another object is to provide an extremely compact unit in which the parts are effectively protected against damage due to moisture, heat, cold, pressure, shock and the like.

Other and further objects will be apparent as the description proceeds and upon reference to the accompanying drawings wherein:

FIG. 2 is an isometric view with parts broken away of the probe head showing the light collecting prism, the photomultiplier tube, the radiation receiving window with its protecting grill, and the connection of the probe head to the coaxial cable;

Figure 1:
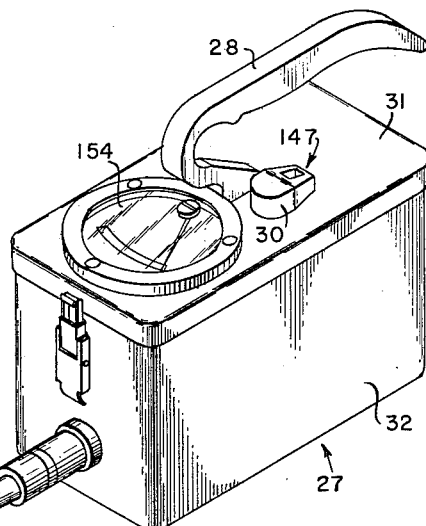
FIG. 1 is a perspective view of the detector with the probe thereof connected to the meter carrying case by a coaxial cable.
Figure 7:
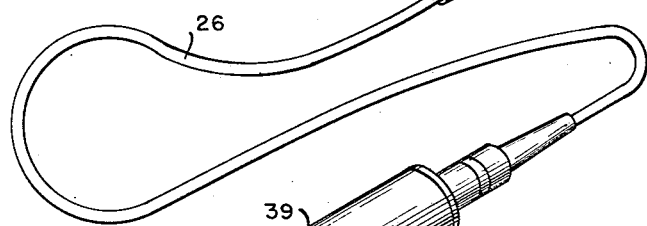
Figure 6:
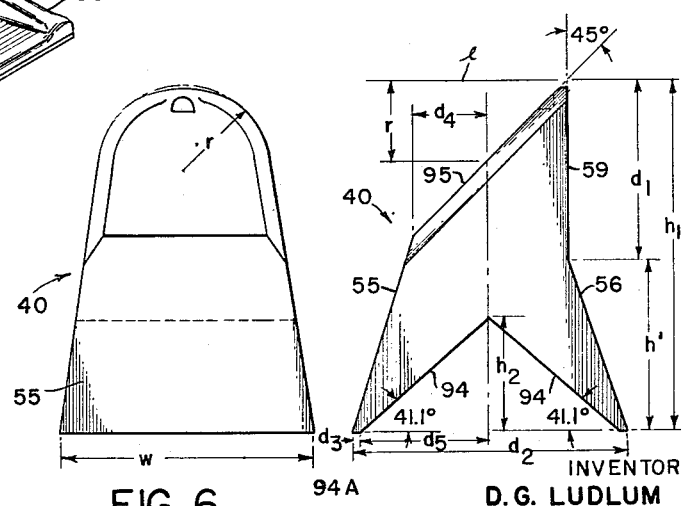
Figure 5:
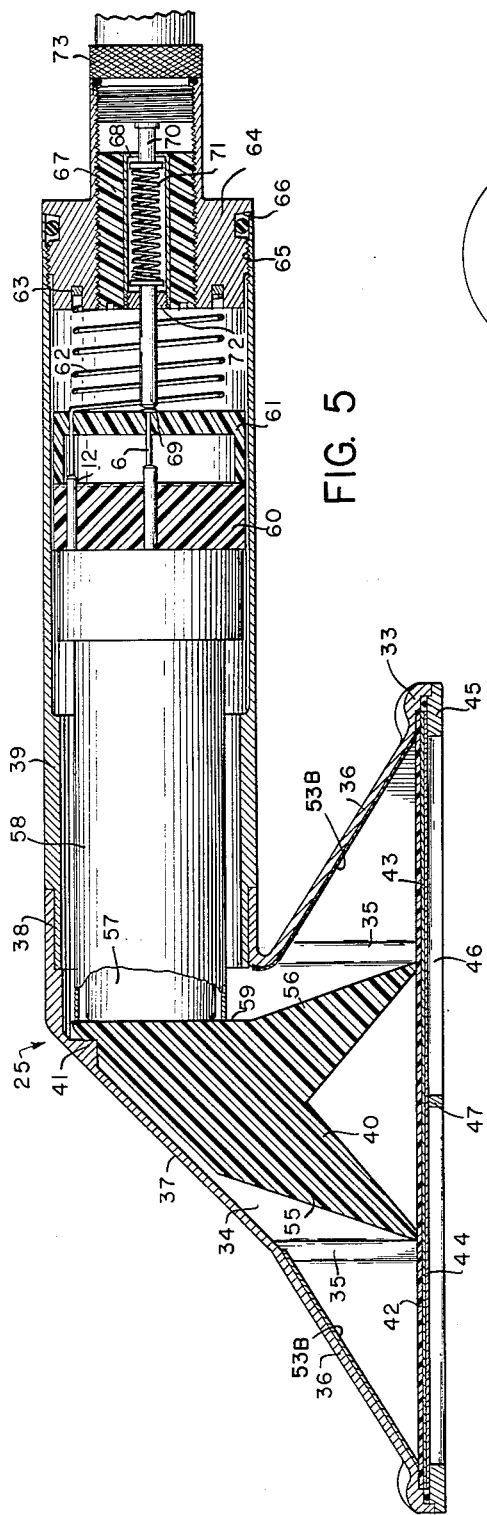
Figure 4:
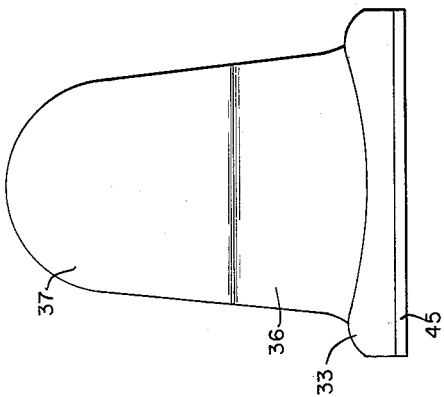
Figure 15:
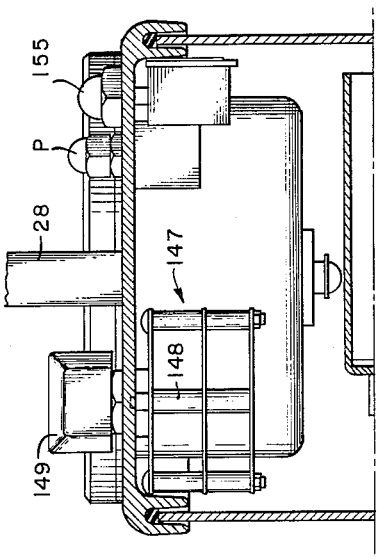
Figure 8:
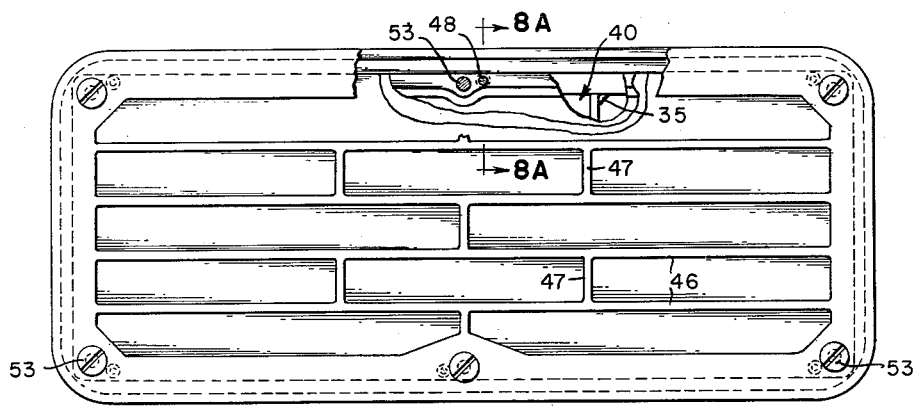
Figure 8A:
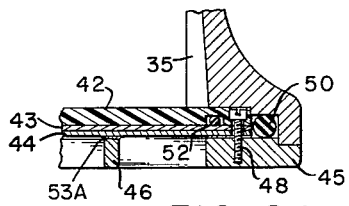
Figure 9:
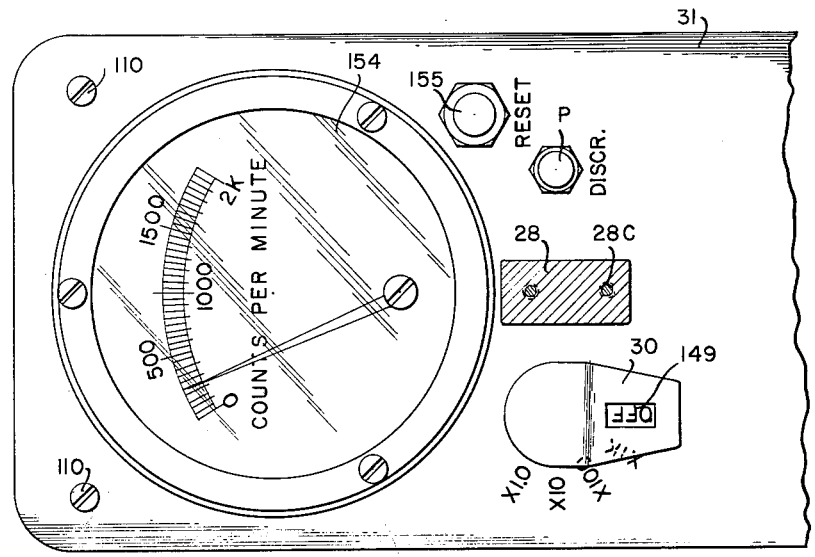
Figure 16:
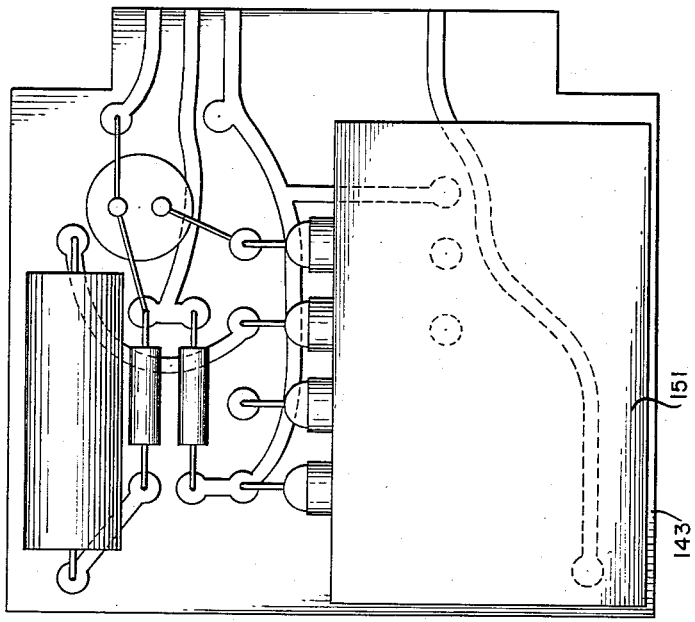
Figure 17:
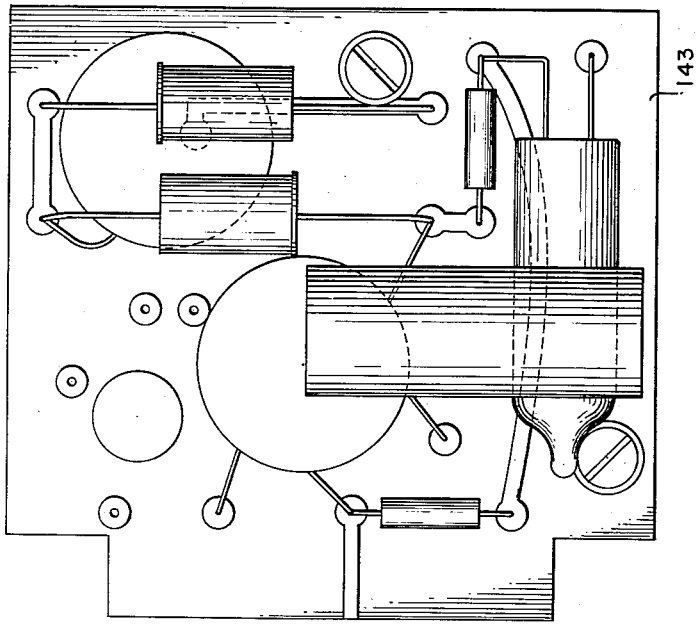
Figure 18:
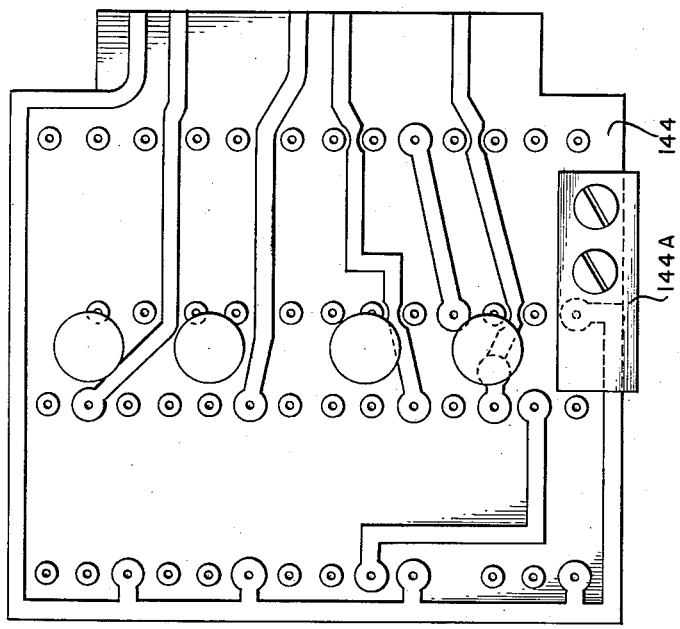
Figure 19:
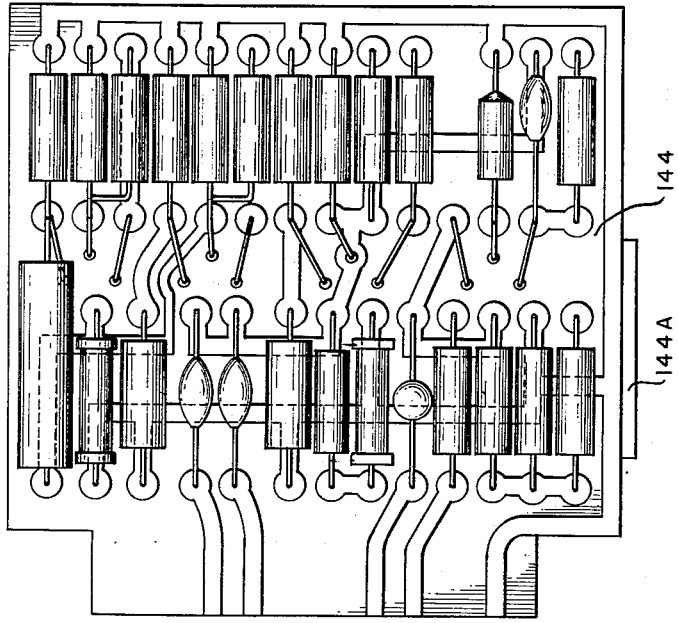
Figure 20:
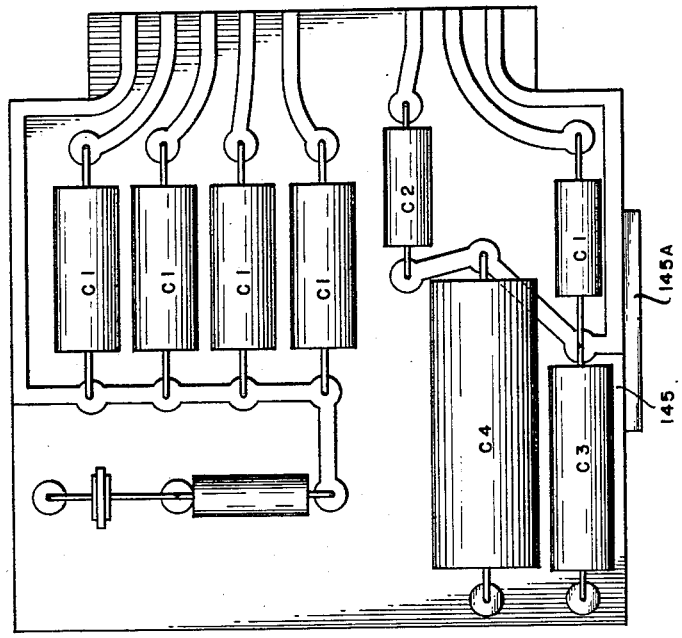
Figure 21:
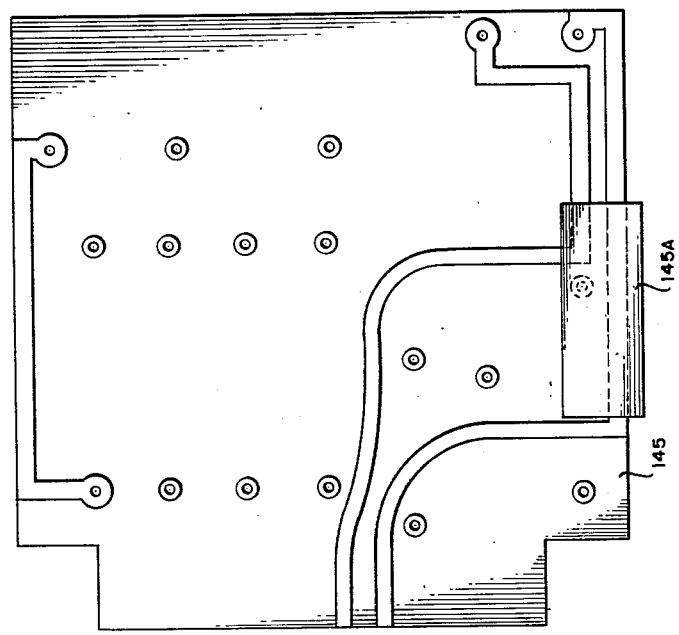
Figure 23:
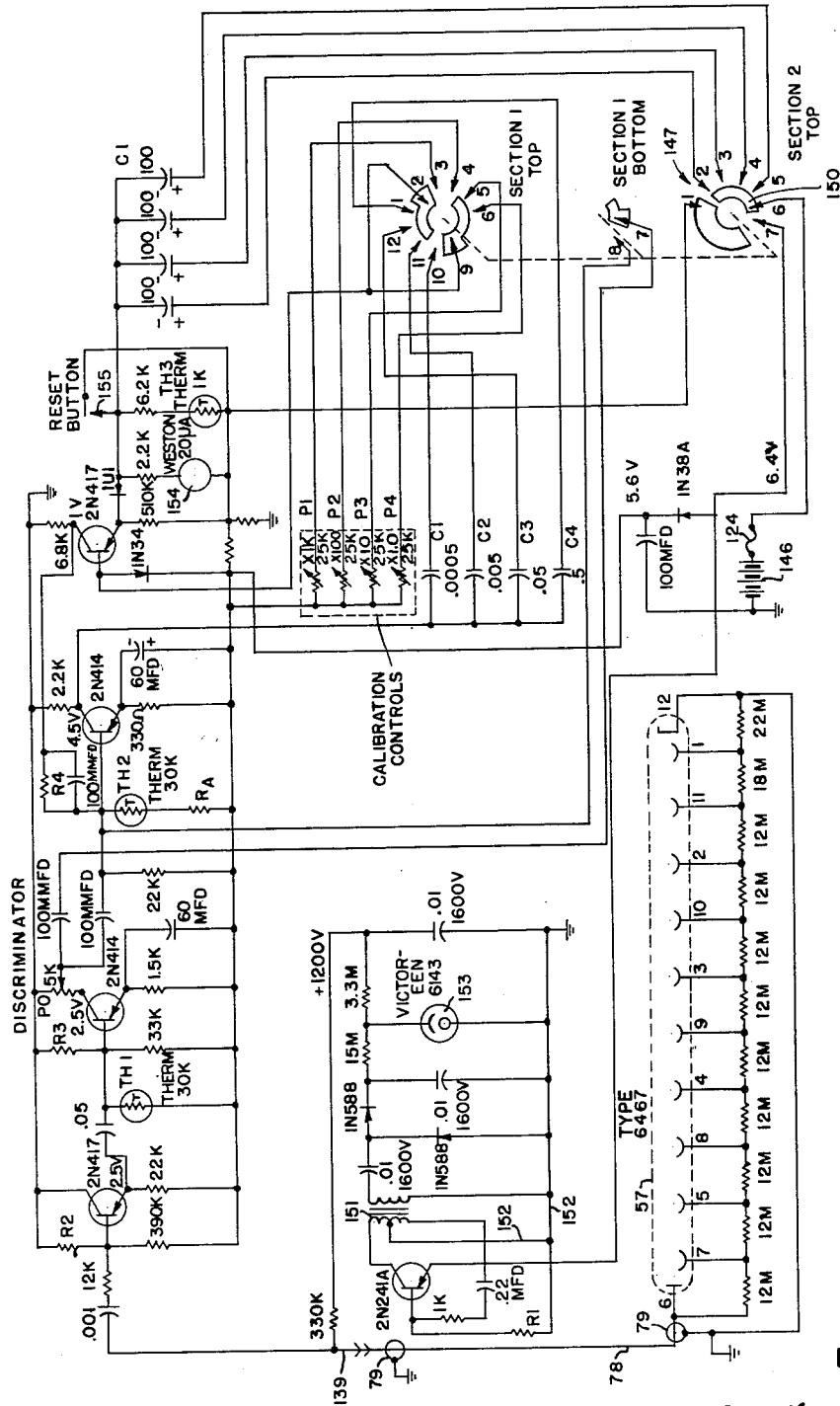

FIG. 3 an enlarged fragmentary transverse sectional view of the probe showing the connection of the window and protecting grill to the body of the probe head;

FIG. 4, a front end view of the probe head;

FIG. 5, a longitudinal vertical section of the probe head and handle showing a portion of the photomultiplier tube;

FIG. 6, a front elevation of the light collecting prism;

FIG. 7, a left side elevation of the light collecting prism;

FIG. 8, a bottom view of the probe head with parts broken away showing the window protecting grill and the prism retaining ribs;

FIG. 8A, a fragmentary section taken on line 8A—8A of FIG. 8 showing the connection of the Lucite plate to the grill;

FIG. 9, a plan view of a portion of the cover of the meter carrying case showing the meter, the selector switch with its multiplier scale, the discriminator adjustment, and the reset switch;

FIG. 10, an isometric view of the male connecting coupling for the coaxial cable;

FIG. 11, a longitudinal section through the coupling of FIG. 10 showing the connection of the coaxial cable to the coupling;

FIG. 12, a left side elevational view of the meter supporting case with parts broken away and parts in section showing the cover sealing arrangement, the chassis and battery in the case and showing the front can retaining latch in latched position and the rear latch with parts broken away and in unlatched position and showing the female cable connector in section;

FIG. 12A, a section taken substantially on line 12A—12A of FIG. 12 showing the plug and socket connection between the battery case and the chassis;

FIG. 13, a right side elevation of the chassis and cover of the meter supporting case showing the removable high voltage supply, amplifier trigger, and meter accessory circuit cards secured in position by screws through the chassis;

FIG. 13A, a transverse section taken substantially on line 13A—13A of FIG. 13 of the high voltage and ground connections from the cable connector and can to the chassis;

FIG. 13B, a longitudinal section taken substantially on line 13B—13B of FIG. 13A;

FIG. 14, a horizontal section of the battery box taken substantially on line 14—14 of FIG. 13 through the battery box with a portion of the can shown in section to illustrate the close fit of the chassis in the can;

FIG. 15, a fragmentary transverse vertical section through the case including the cover, the case, and chassis taken rearwardly of the switches and looking toward the front end of the case;

FIGS. 16 and 17, front and rear elevations of the high voltage supply card;

FIGS. 18 and 19, front and rear elevations of the amplifier trigger card;

FIGS. 20 and 21, front and rear elevations of the meter accessory card;

FIG. 22, a fragmentary sectional view showing an electrical connection between the socket and one lead of the meter accessory card which connection is similar for the other cards;

FIG. 23, a wiring diagram of the circuits; and

Figure 24:
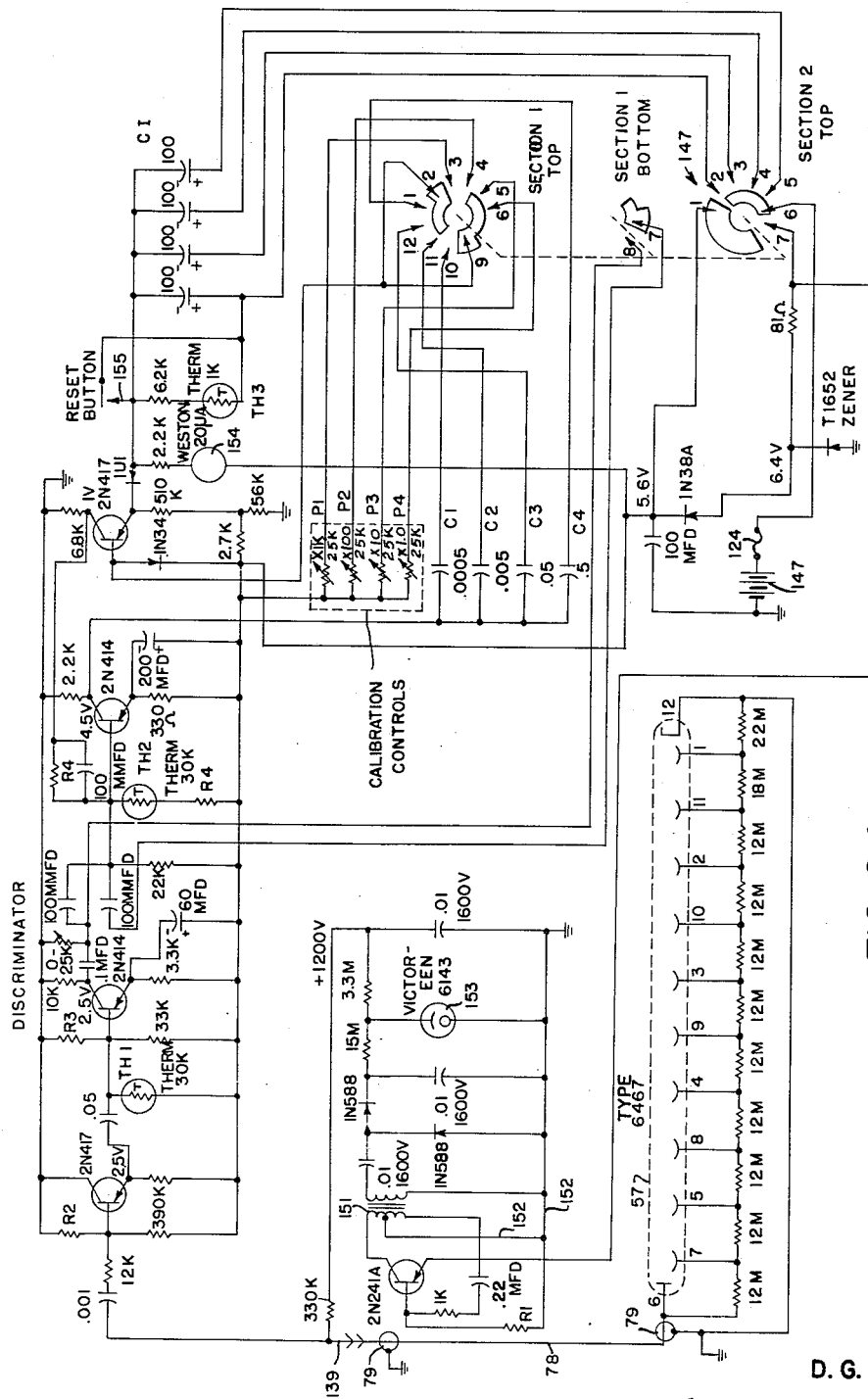

FIG. 24, a wiring diagram of a modified circuit which loads the amplifier and changes the gain.

Briefly, the present invention comprises a probe head having a light collecting prism therein with a grill protected window for admitting alpha radiation therethrough and supported by a transparent Lucite plate having a fluorescent material on its outer surface which scintillates from the effect of alpha radiation on such fluorescent material. The probe head also includes a hollow cylindrical handle substantially parallel to the window by means of which the probe is manipulated, the handle carrying an end window photomultiplier tube which receives the light collected by the prism. For accurate count the end window should not scintillate the radiation other than the radiation being counted and quartz is a material which has been satisfactory. Lucite should also be satisfactory.

A coaxial cable with suitable connections extends from the outer end of the probe handle to a meter supporting case which case, in addition to carrying the meter, carries the power supply and the electronic circuits and equipment for counting the radiation particles. The circuit includes an exposed manually operated selector switch on the cover by means of which the detector can be adjusted to count low and high concentrations of alpha particles. An adjustment discriminator and a reset switch are provided on the cover.

The case has a removable cover supporting a meter and a chassis is suspended from the cover, such chassis carrying the electronic equipment, the cover being removable with the equipment to permit inspection, adjustment, and repair, the components of the circuit being in part arranged on removable cards which may be readily replaced for servicing.

The cover of the carrying case is provided with a handle by means of which the case can be moved from place to place and carried in one hand of the operator while the other hand of the operator supports the probe whereby the operator can readily move the equipment and survey the area for alpha radioactivity, reading the count rate on the meter and interpreting the meter reading by the multiplier indicated by the selector switch.

Upon more detailed reference to the drawings, a probe head 25 is connected by means of a coaxial cable 26 to a meter carrying case 27 which is carried from place to place by a handle 28 secured to the cover, the cover carrying a microammeter 154 having a scale reading from 0 to 2,000, the actual count rate being dependent upon the position of and the multiplier indicated by a selector switch handle 30 which is also supported on the cover 31, the cover closing the open top of the can 32 forming the body of the meter carrying case 27.

Referring specifically to the probe 25 shown in FIGS. 1 to 5, such probe comprises an elongated body having a grill mounting flange 33 extending outwardly of the periphery thereof and having slightly converging planar side walls 34 with prism locating ribs 35 on the inner surface of such side walls. The probe includes front and rear gable portions 36 and a more steeply inclined top gable portion 37 which is rounded adjacent its upper end and the probe is provided with a rearwardly extending hub 38 having an accurate bore therein into which a photomultiplier receiving sleeve or handle 39 is fixed by means of a shrunk fit between its reduced front end and the bore in said hub 38 to assure permanent fluid tight securement of such sleeve in the probe head. Within the probe head a transparent light collecting prism 40 of generally inverted Y-shape is mounted, such prism being retained in position by the ribs 35 on the inner surfaces of the side walls 34 and one or more positioning lugs 41 extending inwardly from the inner surface of the top gable portion 37 of the probe head.

The light collecting prism 40 is made of Lucite and has accurate proportions and angles as shown in the drawings for collecting light impinging thereon from a coating of fluorescent material such as silver activated zinc sulphide on the under surface of a transparent plate 42 of Lucite or the like. In contact with the under surface of the plate 42 are two thin layers of material 43 which is preferably Dutch leaf aluminum and which is opaque to light but is sufficiently thin to permit the passage of alpha particles therethrough. Below such layers of Dutch leaf aluminum 43 is a layer of Mylar material 44 of a thickness to permit penetration of alpha particles and being in the order of .0002 inch thick and which may be coated with a very thin coating of aluminum on each surface. The Mylar material is adhesively secured to the window protecting grill therebelow, which grill includes a peripheral rim 45 and a plurality of longitudinal grill bars 46 and transverse bars 47.

From the showing in FIGS. 3, 5, 8 and 8A, the layers of material are shown in intimate contact with one another and the transparent plate 42 is secured by screws 48 passing through countersunk apertures in the Lucite plate 42 and threaded into upwardly opening threaded bores closed at their bottoms and located in the rim portion 45 of the grill thereby forming an integral window unit of the grill, Mylar material, Dutch leaf material, and Lucite plate 42 to permit ready replacement of such window unit. Such window unit also serves to maintain the prism 40 in position along with the ribs 35, lug 41 and the photomultiplier tube 57.

Upon reference to FIG. 3, the light and fluid tight seal between the flange 33 of the probe head and the window assembly is illustrated. The flange 33 is provided with a first rabbet 49 receiving an O-ring 50 which extends around the periphery of the probe head while a second rabbet 51 receives the edge of the Lucite plate 42. The Lucite plate is provided with a groove around its periphery receiving an O-ring 52 which provides an effective seal between the Lucite plate 42, and the laminations including the Dutch leaf 43 and the Mylar material 44, which several layers of material are secured to the grill by the screws 48 thereby providing a complete and removable window assembly.

The rim 45 of the grill is provided with six countersunk bores receiving oval head machine screws 53 threaded into bottom opening threaded bores in the flange portion 33, it being noted that such threaded bores do not open outwardly of the probe. The surface of the head of the screw 53 adjacent the threaded shank is provided with a groove receiving an O-ring 54 which provides an effective seal between the head of such screw 53 and the bottom of the counter bore in the grill which receives such head. It will thus be seen that a fluid and light tight window unit is fixed to the open bottom of the probe head.

The probe head and grill are preferably made of aluminum and the outer surface is smooth and chrome plated to simplify cleaning thereof. Since the Mylar material 44 is adhesively secured to the rim 45 and bars 46 and 47 of the grill forming a sort of rounded fillet 53A, contaminating material is prevented from collecting between the grill and the Mylar material and if any contaminating material does collect, it can be easily removed.

It will be evident that the window assembly can be readily replaced in the event of damage to the layers of material from contact with obstructions, but it will be apparent from the shape of the grill and the arrangement materials that the layers of material are effectively protected.

The inner surfaces of the sides 34 of the front and rear gable portions 36, 36 are provided with reflecting or mirror-like surfaces which assist in directing light from scintillations of the fluorescent material to the various surfaces including the forward and rear surfaces 55, 56 of the prism 40, the mirror surface being made by any suitable means including aluminum foil, electro plating, polishing or the like.

Within the sleeve 39 which also forms the handle for the probe, an end window photomultiplier tube 57 is mounted in a protective insulating sleeve 58. The end window is of a material which will not scintillate from gamma radiations so that the alpha count will be accurate. Quartz is one suitable material. The cathode of the photomultiplier tube is provided on the inner surface of the end window, the outer surface of such end window being in intimate optical contact with the vertically extending rear face 59 of the prism 40. The photomultiplier tube is mounted by means of its pins in a socket 60 which carries suitable resistances between its contacts as shown in FIG. 23, such resistances being received in a component cup 61 having a center contact 6 for connection with the plate of the photomultiplier tube 57. The component cup 61 has an opening for receiving the forwardly extending end of a coil contact spring 62 which is adapted to make contact with the ground or cathode lead 12 of the photomultiplier, the other end of such coil spring being provided with a ring 63 which is received in a groove in the forward enlarged end of a cylindrical connector element 64. The outer periphery of such connector element is provided with threads 65 for cooperation with internal threads on the rear end of the probe handle sleeve 39. The spring 62 maintains the end window of the photomultiplier tube in optical contact with the face 59 of the prism.

A circumferential groove 66 is provided on the outer periphery of a large diameter portion of connector element 64 adjacent the rear thereof and receives an O-ring which cooperates with a smooth inner periphery of the rear end of the handle sleeve 39 thereby assuring a sealed fluid tight connection. The connector element 64 has an internally threaded bore and receives an externally threaded Teflon sleeve 67 which receives a hollow cylindrical brass insert 68 having a flange on its inner periphery at its rear end and having internal threads at its open forward end.

A long brass connector contact 69 and a short brass connector contact 70, each having a head at one end, are mounted with their head ends in the brass insert 68 and pressed in forward and rearward directions, respectively, by a Phosphor bronze spring 71 and are retained in the insert 68 by a threaded apertured plug 72 at the front end and the inwardly extending flange on the rear end. Elements 68 to 71 are gold plated.

To provide for the connection of the supply of current to the photomultiplier tube and for the return of a signal, the coaxial cable 26 is provided with a cable connector 73 at each end. The cable connector body 73 includes a first externally threaded hub portion 74 extending in one direction and a second externally threaded hub portion 75 extending in the other direction with a Teflon sleeve 76 within the hub 74 and the inner end of a tapered insulating rubber-like flexible sleeve 77 within the hub portion 75.

The coaxial cable 26 includes a center conductor 78 and a braided tubular outer conductor 79, the braided tubular conductor 79 being pressed against a dividing partition in the body 73 by a washer 80 which engages the inner end of the insulator 77. The insulator 77 is pressed into the hub by the threaded collar 81 having its inturned flange urging a washer against a shoulder on the enlarged end of the insulating sleeve 77 to assure effective electrical contact of the braided outer conductor 79 with the body 73.

The Teflon insulating sleeve 76 receives a brass contact element 82 which is provided with barbs or with a continuous ridge 83 around its periphery which engages the inner periphery of the Teflon sleeve 76 to assure effective insulation of the contact element 82 from the body of the coupling and from the body of the coupling element 64 in the event that the conductor 78 forces the brass sleeve outwardly due to changes in length resulting from changes in temperature. Secured to the outer end of the central conductor 78 is a contact point 84. The one hub 74 is provided with an O-ring 93 in a receiving groove for sealing the connector in fluid tight relation to the probe head or to the can connector element.

To provide an insulated and fluid tight connection between the cable 26 and the equipment within the meter carrying case 27, a case connector element having a body 85 is provided with a hub 86 which is received within a bore in the front end of the can 32. A fluid seal is maintained by an O-ring 87 in a groove at the connector body end of the hub, the body being retained by machine screws 88 passing through apertures in the can and threaded into closed bottom threaded apertures in the connector body 85. These screws 88 are provided with O-rings to prevent leakage. The outer end of the connector body is provided with an internally threaded hub 89 into which a Teflon insulator 90 having an outwardly extending flange at its outer end and an inwardly extending flange at its inner end is threadedly received.

A hollow cylindrical brass insert 91 is provided with an internally extending flange at its outer end and internal threads on its inner end and receives a short contact substantially the same as contact 70 at its outer end. The threaded enlarged end of a contact pin 92 is secured to the inner end of the brass sleeve 91, the short contact 70 being biased by a spring in cylindrical insert 91 thereby providing for effective electrical contact with the contact 84 of the connector 73. Effective fluid tight seal is maintained by an O-ring 93 in a groove in the hub 74 of the connector body 73.

The prism 40, as shown particularly in FIGS. 6 and 7 of the drawings, includes the dihedral angle formed by the inner surfaces 94 of the legs of the inverted Y-shape and such legs extend at an angle of 41.1° to the face of the window, the ends of the legs being cut away to provide seat portions which rest of the Lucite plate 42. The forward surface of the stem of the inverted Y-shaped prism is cut at substantially 45° and is chamfered around its upper rounded edge and the side. The 45° surface 95 is aluminized to provide an effective reflecting surface and one or more notches are provided for accurately positioning the prism in the probe head. The substantially vertical surface 96 receives the light collected by the prism and transmits such light to the photomultiplier tube 57.

By way of example, the prism may have dimensions in which the height $h_1$ is 2.608 inches and the distance $d_1$ is 1.404 inches from the point of intersection of the surface 95 and the surface 59 to the intersection between surfaces 59 and 56. The radius $r$, for example, is .6875 inch to the imaginary line $l$. The distance $d_2$ is shown as 2.125 inches and the seat portion 94A is shown as being of a distance $d_3$ of $\frac{1}{16}''$ while the height $h_2$ from the base line to the apex of the dihedral angle between surfaces 94, 94 is shown to be .875 inch. The distance $d_4$ from the center line to the intersection of surfaces 55 and 95 is shown to be .562 inch. The distance $d_5$ is shown as 1.000 inch. The width $w$ is shown to be 1.986 inches. It will be understood that these dimensions are used to provide an accurate fit with the probe head body and are representative of the proportions used. Variations which will produce the desired results are intended to be covered in the claims and applicant does not wish to be limited to the precise angles and dimensions indicated although it has been found after much experimentation that such angles and proportions work out very satisfactorily.

The window protecting grill is shown in FIGS. 8 and 8A and the arrangement of the cross bars and longitudinal bars thereof is such as to obtain maximum passage of alpha rays in the spaces between the bars. The Lucite plate 42 is held in place by the screws 48 passing through counterbored apertures in the Lucite plate and threaded into closed bottom threaded openings in the grill rim 45 thereby preventing any danger of contamination leaking into the probe head. This arrangement provides for removal and replacement of the window unit by merely removing grill attaching screws 53.

Upon more detailed reference to FIGS. 12 and 13, the open top of the can is closed by the cover 31 which has a continuous peripheral downwardly opening gasket receiving groove 97 in a downwardly extending peripheral flange of the cover 31, such groove being of a shape to receive the upper edge of the aluminum can 32.

A resilient gasket 98 which may be of the O-ring type is received in groove 97 and provides an effective seal between the cover and the can. The cover is provided with forwardly and rearwardly extending lugs 99 which cooperate with toggle-type clamping fasteners 100 which have springs 101 urging a telescopic lug engaging loop member 102 in cover retaining position whereby the cover is constantly urged toward the can with a continuous bias by the spring 101. This structure provides a sealed meter case while permitting removal of the cover and also permitting leakage of confined gases from within the case in the event that the atmospheric pressure falls appreciably below the pressure in the can, the pressure of the gas in the can serving to raise the cover sufficiently to permit gas to escape while preventing the atmosphere from being drawn into the case when atmospheric pressure exceeds the pressure in the can.

Suspended from the cover 31 is a chassis of generally J-shape formed from a sheet of aluminum approximately the width of the can leaving a clearance in the order of ¼″, the stem portion 103 extending generally vertically downward from the cover 31 and being secured at its upper end by means of a rearwardly extending flange 104 and a pair of screws 105 passing through counterbored apertures in the cover 31 and having their heads sealed with O-rings. The base 106 of the J-shaped chassis extends forwardly from the stem portion 103 to the short leg 107 which extends upwardly and has a forwardly extending flange 108 held in spaced relation to the cover 31 by spacer elements 109 secured to the flange 108. The spacer elements have their upper ends fixed to the cover by screws 110 passing through counterbored apertures in the cover and are sealed with O-rings in a manner similar to the sealing of screws 105.

The chassis also includes a longitudinally extending partition 111 which is formed integrally with a 7-shape dihedral shield having a stem 112 and a horizontal leg 113, the horizontal leg 113 being connected to the longitudinal partition 111 by being formed from the same sheet of material with a horizontal bend connecting the 7-shape shield and the longitudinal partition at the upper edge of the longitudinal partition. The lower end of the stem 112 and the rear end of the horizontal leg 113 of the 7-shape shield are provided with flanges secured to the base 106 and the stem 103, respectively, of the J-shape chassis thereby providing a rigid unitary structure. A forward flange 114 and a rear flange 115 on the longitudinal partition 111 provides for securement of the partition to the stem and short leg of the J-shape chassis.

To provide power for the detector, a battery housing is formed from an open sided aluminum can 116 with the opening on the left side of the can (FIG. 12) and such opening is closed by a cover 117 of a non-conductive material such as a phenolic resin. The cover 117 has a peripheral rib 118 received in the can, the rib being inwardly of the edge of the cover so that the edge portion of the cover retains the cover on the open end of the can.

The rib 118 extends substantially around the periphery of the can fitting into the can 116, the rib having a socket receiving notch formed therein. The notch formed in the peripheral rib 118 communicates with a notch in the edge of the cover beyond the rib 118 and such notches receive a female insulated receptacle 119 having a pair of socket element receiving bores 120 which communicate with grooves 121. Each bore and its associate groove receives conductive socket elements 122, 122′. Socket element 122 has a tab to which a lead 123 from the battery secured. An identical socket element 122′ is provided in the other bore and has a lead 123′, see FIG. 14, which extends to a fuse wire 124 and the other end of the fuse wire is connected by a lead to the other terminal of the battery by a suitable lead 124′. The fuse wire 124 which may be a number 30 wire is secured between terminals fixed to and insulated by the insulating cover 117 to prevent any possibility of damage from a short circuit.

It will be noted that the receptacle block 119 is maintained in a definite position by the cover 117 and by the notch in the can, and the socket elements 122 and 122′ therefore are loosely received and are retained by the bottoms of the bores 120 and by the shoulder formed by the communicating groove 121 and the material of the block 119. Block 119 is glued to the cover 117. The cover 117 and block 119 may be made as an integral unit by molding or the like.

The battery cover is secured in position by screws 125 in countersunk openings in the cover and such screws are threaded into a dividing partition 126 in the can, the partition being held in place by countersunk screws threaded into the partition.

The battery can and its cover are secured to the chassis by means of bolts 127 passing through bores in the partition 126 and threaded into flanged threaded sleeves fixed to the stem portion 103 of the J-shape chassis. The partition 126 has a leaf spring 128 on each side thereof to press the cells between the partition and the opposite wall of the cam 116 to maintain the battery cells in place. The various cells are connected together by conductive bars 129.

It will thus be seen that the battery receiving housing can be removed by loosening the two securing screws 127 and separating the receptacle block 119 with its socket elements from the prongs 130 of the cooperating male plug. The prongs 130 are loosely retained in a block 131 of insulating material by intermediate enlargements or collars of the prongs, the prongs loosely fitting the counterbored apertures in the block 131 and being held in position by the insulating plate 132 which is secured to the block 131 and to the stem portion 103 of the J-shape chassis by screws having their heads countersunk in the chassis and nuts cooperating therewith as shown.

To provide electrical conductivity between a ground in the can 32 and a ground in the aluminum chassis, a trapezoidal-shaped leaf spring 133 having its corners 133A bent at 45° toward the front wall of the can to bite into the can beyond a sealing gasket 133B is secured by means of latch attaching screws 134 having O-ring seals to the can and the stem of such leaf spring engages an arcuate-shaped spring 135 made from a trapezoidal-shaped sheet and secured to the undersurface of the shelf 108, see FIGS. 13A and 13B, between the upper surface of an insulator 136 and the shelf. A second insulator 136A having a hub 136B is connected by a bolt 136C passing through spring 137 and a center soldering contact 137A which provides the center contact for the center wire of the coaxial cable.

The spring 137 of V-shape is secured by one of its legs in a groove on the undersurface of the insulator 136 by the bolt 136C passing through such leg of spring 137 and passing through the second insulator 136A, the hub 136B of which passes through an enlarged aperture in the shelf 108, an enlarged aperture in the spring 135 and through an enlarged aperture in the cross bar of a T-shaped ground solder lug 138 mounted with its cross bar against the lower surface of shelf 108 and its soldering contact 138B passing through an aperture in shelf 108.

The position of the insulators 136, 136A, the spring 135, and ground lug 138 is obtained by pins 138A passing through apertures maintaining the alignment and position whereby the single insulated contact bolt 136C maintains all parts in assembled relation.

It will thus be seen that the insulator 136 performs a dual function of maintaining the spring contact 135 out of contact with V-shaped spring 137 providing for effective contact between the circuitry in the chassis and the coaxial cable center wire contact 92 of can connector 85.

The chassis is provided with card receiving socket 140 for the high voltage power supply, socket 141 for the amplifier trigger circuit and socket 142 for the meter accessory card. Received in such sockets are circuit cards 143, 144 and 145, respectively, and mounted on such cards are some of the circuit components shown in FIG. 23.

Referring to FIG. 23, the lead 139 provides the connection of the high voltage supply and the amplifier and the trigger circuits.

The primary voltage supply is obtained from a battery 146 which has one terminal grounded and the other terminal connected to the fuse 124 to contact number 6 of the top surface of section 2 of a selector switch 147, which selector switch has a rotary shaft 148 which is turned by the selector switch handle 30.

In the position shown in the drawings, the switch is shown in its inoperative or off position but when moved in a clockwise direction, contact 6 makes contact with contact 7 of section 2 by segment 150 thereby completing a circuit to the emitter of the transistor in the high voltage supply located on card 143. The collector of the transistor is tied to one side of the primary of a transformer 151. The other side of the primary is tied to the supply voltage common 152. A second winding of the power supply is connected to the base of the transistor, such connection providing a D.C. blocking capacitor and a small limiting resistor in series with the second winding of the transformer. A third winding of a transformer supplies the step-up voltage and drives a voltage doubler.

Regulation is obtained by a corona regulator tube 153. When the current is turned on by the clockwise movement of the selector switch handle 30, current flows from the emitter to the collector of the transistor through the primary of the transformer 151 and such current in the primary induces a voltage in the second winding in a direction driving the transistor to saturation. As the current in the primary stabilizes at the saturation value, voltage in the second and third windings collapse due to lack of current change in the primary. This collapsing voltage tends to drive the transistor to cut off and this effect is amplified in that the base of the transistor shows an increasingly higher resistance as it goes to cut off. As the transistor is cut off, a very sharp change in voltage polarity occurs in the primary winding. This rapid change drives the transistor far into the cut-off region resulting in a very large base resistance and voltage. The base voltage is blocked by the capacitors in the base network and discharges through the base resistance and R–1. As the base voltage discharges to near the supply voltage, the cycle is repeated.

The frequency of oscillation is determined by varying R–1 between the base and the supply voltage common 152. This resistor, in effect, controls the base resistance and discharge time of the base voltage. By varying R–1 the available output of the power supply can be controlled and this allows a broad tolerance of component values.

Stability of this high voltage power supply is enhanced by the fact that the controlling phenomenon is the turns ratio of the transformer, primary resistance and R–1. Performance of the supply is relatively independent of the coupling capacitor to the base as long as it is large enough to pass the basic wave form. It will be apparent that the components of the high voltage circuit described are supported on the high voltage supply card 143 which is provided with leads which engage contact elements in the cooperating socket member 140.

The circuit on the amplifier trigger card 144 amplifies pulses generated by the phototube, shapes all pulses above a predetermined level to a given height and width, rectifies the shaped pulses and supplies an output voltage proportional to the average area of the shaped pulses. The circuit on this card 144 works in conjunction with the circuit on the meter accessory card 145.

The first stage of the amplifier trigger circuit supplies the power gain to incoming pulses. The input impedance of this stage is approximately 80,000 ohms. The output impedance is approximately 2,000 ohms. The voltage level of the incoming pulse is approximately the same as the voltage level of the output pulse.

This first stage of the amplifier is relatively independent of temperature variations in the range of −40° F. to +140° F. as changes in leakage current result in only minor changes of the operating point because all signal is developed across the emitter resistor. Resistor R–2 is selected for a given transistor so that the emitter voltage of the first stage is approximately 2.5 volts for a supply voltage of 6 volts.

The second stage, or the voltage amplifier, has its gain controlled by a potentiometer which also serves as the collector load resistor of the second stage transistor. The gain of the stage is approximately 30, varying directly with the gain characteristic of the transistor.

This second stage is compensated for temperature variations by the combination of a resistor in the emitter lead and a thermistor T$h$–1, resistor network in the base. A resistor R–3 is selected for each transistor to obtain 2.5 volts on the collector. As temperature increases, collector current increases due to logarithmic increases in leakage current and increase in transistor gain. As this current tends to increase, an increase in emitter voltage causes a decrease in the rate of change of the collector current. The thermistor T$h$–1 is incorporated to further decrease the base current. With both networks, operation at very low current levels are possible at high ambient temperatures such as temperatures above 110° F.

Due to the constant current characteristics of transistors, the voltage from emitter to collector can vary from approximately .5 volt to 5 volts with negligible effects on gain. This characteristic aided by a double compensating network allows wide transistor tolerance in this circuit.

The trigger consists of the third and fourth stages of the amplifier trigger card 144. The function of the circuitry of the trigger is to generate a constant pulse for all incoming pulses above a predetermined voltage level called the triggering level. This circuitry works in conjunction with the meter accessory card 145 and calibration potentiometers P–1, P–2, P–3, and P–4.

With no pulses present, the first stage of the trigger is biased near saturation. When a positive going pulse appears at the base of the first stage of the trigger, this pulse is amplified and passed through the time constant capacitor to the base of the second stage transistor of the trigger. The second stage of the trigger starts to conduct, developing a positive going pulse across the second trigger stage collector resistor. This pulse is coupled through a resistance R–4 into the base of the first stage of the trigger. This action is cumulative and results in the first stage of the trigger being driven into cut-off and the second stage of the trigger being driven into saturation. This condition remains after the incoming pulse is gone. The potential of the trigger first stage emitter is held more positive (by a large emitter capacitor) than the trigger first stage base which is directly coupled to the trigger second stage collector.

The trigger circuit recovers to its original condition as the charge on the time constant capacitor decays. This decay is controlled by the resistance value of the selected calibration potentiometer P–1, P–2, P–3 or P–4 and the resistance in the trigger second stage base. As the trigger second stage base voltage drops it comes out of saturation and the collector voltage slowly drops until the voltage supplied to the base of the trigger first stage no longer holds that stage off. When this occurs, the decreasing voltage is amplified by the trigger first stage and the original condition of the trigger is restored.

When the trigger returns to its original state, the circuit is normally dead for a period of time approximately equal to the pulse length from the circuit. This caused by a large residual charge on the time constant capacitor C–1, C–2, C–3 or C–4. This "dead" time is greatly shortened by by-passing the calibration control potentiometers P–1, P–2, P–3 or P–4 with a diode, the diode furnishing a low impedance path for discharging the residual charge.

A voltage output is secured by placing a diode and integrating capacitors in the emitter of the trigger second stage. When a pulse triggers the circuit, the current pulse that flows in the trigger second stage charges the integrating capacitors C–1 which supply a relatively constant source of energy to drive a microammeter 154. The microammeter 154 will deflect proportional to the number of pulses that occur in the trigger per unit of time (i.e., rate).

Scale changing is accomplished by switching in a selected different time constant capacitor C–1, C–2, C–3 or C–4. The instrument is arranged to give full scale meter current for 600, 6,000, 60,000 or 600,000 events per minute. This gives an indicated alpha of 2K, 20K, 200K or 2M count per minute.

Due to the relatively long time constant of the meter circuit, a reset switch 155 is incorporated to rapidly discharge the integrating capacitor thereby enabling the operator to avoid the delays in meter response and obtain prompt reading from one point to another.

The temperature compensation for the third and fourth stages which are the trigger first and second stages is extremely critical and the trigger first stage must be held very close on operating point, as a one percent change in the collector voltage results in approximately two percent change in the meter reading.

Temperature compensation is accomplished by a network similar to that of the amplifier network including a thermistor $Th$–2; however, to further stabilize the circuit a resistor RA must be selected to compensate for variation of gain and leakage from transistor to transistor.

The meter accessory card 145 contains the time constant capacitors for the trigger and meter integration capacitors C–I. A meter shunt consisting of a resistor and a thermistor $Th$–3 is included to compensate for supply voltage drop at low temperature.

Upon reference to the wiring diagram shown in FIG. 24, the circuit is similar to that shown in FIG. 23 but the capacitor in the trigger first stage emitter is 200 mfd. instead of 60 mfd. to give better high temperature stability for long pulse lengths. The discrimination method has been changed from potentiometer to loading scheme. The modified circuit is devised to load the amplifier, which in effect changes the gain of the stage. This change improves the saturation characteristics of the amplifier. With setting at maximum gain the amplifier saturation is about ten times triggering level with both configurations. With the prior described circuit, as discrimination was increased saturation level remained fixed and discrimination was limited to about 10:1. With the modified circuit, as discrimination is increased the gain in the stage is decreased resulting in increase of saturation level. Over a considerable range the saturation level will maintain a constant relation to triggering level. The limit is a pulse that approaches 30% supply voltage, or a triggering level of 3% of supply voltage.

A Zener diode (Texas Instruments type) is incorporated to eliminate the predischarge problems associated with storage batteries.

The hand probe 25 contains the basic detecting fluorescent element of silver activated zinc sulphide, the optics including the prism 40 and the reflecting surfaces, the photomultiplier 57 and the dynode network.

The dynode network divides the high voltage to supply 100 volt steps to each dynode, with higher voltages supplied to the last two dynodes. The photomultiplier 57 develops its signal across a resistor mounted on the chassis. The signal from the probe and the high voltage to the probe are carried by the coaxial cable 26.

The aluminum can 32 is grounded to the aluminum chassis suspended from the cover 31 through spring contacts and grounded to the probe through the braided tubular conductor of the coaxial cable. The contact connectors provide a complete seal of the interior of the probe and of the can from the atmosphere.

It will be noted that the high voltage supply circuit card 143 is received within a shielded area by the 7-shape shield 112, 113, and the longitudinal partition 111 with the card being held in position by screws passing through the base 106 of the J-shape chassis and threaded into the housing of the transformer 151 which transformer housing is secured to the card 143. The cards 144 and 145 are provided with insulating blocks 144A, 145A which are secured to the corresponding cards 144 and 145, respectively, and screws passing through the base 106 of the chassis are secured to the blocks thereby maintaining the cards in position when the contacts of the cards extend into the corresponding sockets 141, 142, respectively. The position of the blocks 144A and 145A limit insertion of the card to the particular socket only.

To assure that the chassis can only be inserted in one direction, a polarizing angle bracket 156 is secured by means of threaded fasteners 88 passing through one leg of the bracket and threaded into the closed bottom threaded bores of the connector 85 thereby securing the parts together. A gasket 156A is provided between the vertical leg of angle 156 and the screws 88 are provided with O-ring seals. The horizontal flange of bracket 156 has an arcuate notch therein to assure clearance of the V-shaped spring contact 137 therepast to make electrical contact with pin 92 and such notch also permits free passage of the arcuate grounding spring 135 therethrough to assure proper contact between such arcuate ground spring and the can grounding spring 133. The polarizing bracket 156 will engage the battery can 117 before such can could engage contact pin 92 thereby putting a person on notice that the device is being improperly assembled and the person can correct the mistake without damage. It will be evident that suitable O-ring seals or the like are provided for each screw to assure sealing relation.

The handle 28 is provided with a rectangular base portion which is received in a rectangular recess in the upper surface of the cover 31 and the handle is held in position by a pair of screws 28C received in threaded apertures in the base of the handle with the heads of such screws being inside of the cover and sealed by suitable sealing rings. It will be evident that the entire construction of the instrument including the instrument case provides for fluid tight seals in all operating parts and in the connections therebetween.

The handle 28 is of a particularly advantageous shape to be retained in the hand even though the hand has a large mitten or glove since the index finger will be received between the bight portion of the handle and the downwardly extending lug 28A thereof while the downwardly extending rear extremity 28B of the handle prevents any possibility of the instrument accidentally falling out of a person's hand regardless of whether the hands are bare or are protected with gloves or thick mittens. This arrangement assures that the instrument will be prevented from accidental dropping. The arrangement of the parts provides for a balanced support of the chassis with the battery and the components therein and the position of the meter with respect to the handle assures accurate reading even though a portion of the handle does extend over the rearward portion of the meter window.

The detector is designed for response to alpha radiation throughout the entire area of the probe window, the prism and the reflecting surfaces assuring that a maximum count will be effectively obtained. The instrument is calibrated from a standard source by proper adjustment of the discriminator potentiometer P and the potentiometers P–1, P–2, P–3, and P–4 for the various ranges of the instrument. The total count is shown by the reading of the microammeter times the multiplying factor as seen through the window of the handle 30 of the selector switch thereby making the instrument practically foolproof. The reset switch 155 assures a discharge of the capacitors between settings of the selector switch 30.

By proper selection of turns ratio primary inductance and base network, a highly stable blocking oscillator circuit has been obtained.

In the amplifier trigger card, the temperature compensation is a novel feature. A combination of thermistor network in transistor base and by-pass emitter resistor circuitry will operate over extended temperature ranges at very low collector current levels.

By incorporation of resistive feedback from the collector of the trigger second stage through the first stage base, by-passed with a small capacitor to the high frequencies, in conjunction with a reference voltage on the emitter of the first stage of the trigger, the trigger is made to operate with the first trigger stage in the amplification region.

As a result of this, base impedance level is stabilized and the triggering level is relatively unaffected by count rate. Because of the stabilization impedance, hard differentiation can be used, resulting in a very fast counting circuit.

The characteristics of transistors change rapidly with temperatures and production control of their parameters is not easily obtained by the manufacturer. An example: The 2N414 transistors used in the instrument will have a beta (current gain) variation of from 15 to 200 and leakage current variation of from .5 to 5 microamperes. Beta and leakage current change with temperature. Typically, at the current levels at which the present invention operates, beta decreases from 30% at −40° F. and increases 15% at +140°. For higher current levels the change is considerably less. The present invention overcomes this problem by the use of temperature compensating devices called thermistors in the circuits.

Leakage current which is by far the largest problem is negligible at −40° F. and increases about 20 times at +140° F. The change is logarithmic with temperature and is more rapid for low leakage and less rapid for high leakage. (Average leakage is 1 microampere at room temperature.) The problem with leakage current is that a current will flow in the emitter collector circuit that is approximately equal to leakage current times beta. As an example, a device that has a leakage current of 1 microampere with beta of 100 could be cut off at room temperature but conduct 2 milliamperes at +140° F. With a supply voltage of 6 volts and load resistor of 5K ohms, this device would actually be saturated. To overcome these problems D.C. temperature compensating networks, resistor selection, and extremely stable networks are required and the present invention solves these problems.

It will be evident that the cover 31 can be removed from the chassis by the removal of screws 105 and 110 thereby exposing the wiring harness to permit ease of assembly and repair. The spacers 109 may also be removed by removal of screws passing through the shelf 108 and threaded into the lower ends of said spacers 109. The selector switch 147 is keyed in a fixed position by a lug 147A extending into an opening in the cover, the switch being held in place by the usual securing nut and such switch can be separated from the cover to provide for servicing. The selector switch 147 is operated by handle 30 which has a window or opening 149 through which the multiplying factor may be observed.

The meter 154 is secured in fluid tight relation in the cover and the connections may be removed to permit ease of servicing. The reset switch 155 is mounted on the cover and the potentiometer P is also removably mounted to provide for servicing.

Suitable sealing means are provided for the selector switch 147 and potentiometer P and reset switch 155 which may be of the type covered with a resilient rubber seal.

The arrangement of parts provides for a low thermal inertia whereby the equipment will come to the temperature of the surroundings in a short time so that in the event of a temperature change beyond the normal operating range of the instrument the instrument will become operative quickly upon external conditions returning to the normal range of operation.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. An alpha particle scintillation counter comprising a probe head having a sealed fluid tight window admitting alpha particles, a solid transparent window having a fluorescent material on its outer surface and free from material which fluoresces from gamma rays providing a mechanical support for the alpha penetratable window, an inverted Y-shaped prism extending across the window and forming a dihedral having its legs extending toward and stopping short of each end of said window and with the stem extending upwardly, said prism having a light emitting surface extending at an angle substantially less than 90° to the face of the window said probe head having a handle, a photomultiplier tube in said handle, means to provide fluid tight connection around said handle and preventing the ingress or egress of fluid into said probe head, and light reflecting surfaces within said probe head for directing scintillations of light in said fluorescent material to said prism to assure that scintillations occurring anywhere within the projected outline of the window will produce a scintillation at the light emitting face of said prism.

2. A portable scintillation detector comprising a gable shaped probe head having an enlarged opening in its base for receiving radiation, a transparent window pane closing said window opening, an inverted Y-shaped light collecting prism in said gable shaped probe head with its legs resting on said window pane, said prism being of a size occupying a small portion of the total volume of said gable shaped probe head with the back of the prism extending into the gable, the portion of the probe head adjacent the back of the prism being provided with an opening, a hollow handle registering with said opening and received in fluid-tight and light-tight relation to said probe head for supporting a photomultiplier tube wtih its photo cathode in light coupling relation to said back of said prism and also providing for manipulation of said probe head, a fluorescent material on the exterior surface of said window pane responsive to the radiation to be measured to produce scintillations for collection by said prism for transfer to a photo cathode of a photomultiplier tube in said hollow handle.

3. The invention according to claim 2 in which an alpha particle penetrable light opaque layer is mounted on the fluorescent surface of said window pane.

4. A probe head comprising a hollow body having a radiation receiving window opening and a communicating hollow handle portion for receiving an end window photomultiplier tube, light collecting means in said probe head for collecting light from the window thereof and transmitting such light to the end of said hollow photomultiplier tube receiving handle portion, said body having a double rabbet on the inner periphery of the material defining said window opening, a window pane and supporting grill assembly for closing said window opening in fluid-tight and light-tight relation, said grill being snugly received in the outer rabbet, a layer of Mylar fixed to the inner surface of said grill, a layer of dutch leaf on said Mylar, a transparent window pane coated on one surface with a fluorescent material and mounted with said fluorescent coated surface against said dutch leaf, said window pane being smaller than said grill and being received in said second rabbet, means to secure said window pane to said grill in fluid-tight relation to the periphery and thereby sandwich the Mylar and dutch leaf in fixed relation between said grill and said window pane and providing fluid-tight peripheral contact of said window pane and said grill, and means to secure said window pane and grill assembly in fluid- and light-tight relation to said probe head whereby said probe head will effectively receive radiation such as alpha particles and produce scintillations in said fluorescent screen which scintillations will be collected and carried to the location of the photocathode of the photomultiplier tube.

5. The invention according to claim 4 in which O-rings are used to obtain fluid- and light-tight connections between said window pane and said grill and between said grill and said probe head.

6. The invention according to claim 4 in which the peripheral margin of the grill is provided with a rabbet for cooperation with the projecting portion of the outer rabbet on the probe head accurately locating the pane and grill assembly and cooperating with the periphery of the window pane and the outer rabbet on the probe head to define an O-ring receiving space and an O-ring in said space providing a fluid-tight seal between the probe head and the edge of the window pane and grill assembly.

7. The invention according to claim 4 in which the light collecting means includes a relatively small light collecting prism mounted in said probe head, a photomultiplier tube is mounted in said handle, a spring urges said photomultiplier tube into light coupling relation to said prism, a sealing connector element closes the end of said handle and reacts with said spring in urging the photomultiplier tube into operative position, and means are provided on the connector for carrying a sensitizing supply of electricity to said photomultiplier tube and for carrying away signals produced in said photomultiplier tube.

8. A scintillation detector comprising a hollow body providing a probe head, said hollow body being provided with a window opening, a screen closing said window opening including a fluorescent material responsive to radiation to be detected, means connected to said body to support a scintillation responsive device in spaced relation to said screen, and a light reflecting member in said body between said screen and said device, said member comprising a transparent Y-shape body of substantial width with the inner surfaces of the legs of the Y forming a concave dihedral angle and the inner and outer surfaces of each leg forming a convex dihedral angle, the stem of the Y forming a convex dihedral angle with one surface of the stem providing a light emitting surface of appreciable area, the surface of the stem opposite the light emitting surface serving as a reflector to light passing into the Y-shape body through the concave dihedral angle and through the convex dihedral angles of the legs, said Y-shape body being effective to receive light over an appreciable area beyond the legs and a projected area corresponding to the width of the Y-shape body, the outer surface of each leg being parallel to and close to the screen and the said light emitting surface on the stem being close to the scintillation responsive device.

9. A scintillation detector comprising a hollow body providing a probe head, said hollow body being provided with a window opening, a fluorescent screen closing said window opening and including a fluorescent material responsive to the radiation to be detected, means to seal the fluorescent screen in light-tight relation to said hollow body, a light collecting prism in said hollow body of substantially less volume than the hollow chamber in said body, means to support a scintillation responsive device in light coupling relation to said prism and the fluorescent screen, the interior of said hollow body being provided with reflecting surfaces, whereby to carry all light from the scintillations on the screen to the responsive device.

10. A portable alpha scintillation detector comprising a can; a power supply, amplifier and trigger circuits, a range selector and a meter in said can; a carrying handle on said can; a hollow probe head for cooperation with the equipment in said can, said probe head having an enlarged window for receiving alpha radiation, means in said window for converting said alpha radiation into light scintillations, a fragile thin alpha radiation penetrable foil shielding the exterior of said means from external light, a handle projecting in generally parallel relation to said window, light transmitting means in said probe head, said light transmitting means having portions at the window and adjacent to said alpha radiation converting means for receiving scintillations from said converting means, said light transmitting means having body portions constructed and arranged to conduct the light scintillations from said receiving portions to a remote portion of said light transmitting means, a photomultiplier tube supported by the head and with its cathode extending into light coupling relation to said remote portion of said light transmitting means, a flexible coaxial cable connected to the outer end of said handle and to said can and providing electrical power from the equipment in said can to said photomultiplier tube and for carrying signals from said photomultiplier tube to said equipment while providing for easy movement of said probe head with respect to said can, whereby an operator can readily move the probe head with the window thereof over an area suspected of radiation and can read the results thereof on the meter in said can.

References Cited in the file of this patent

UNITED STATES PATENTS

| | | |
|---|---|---|
| 2,448,963 | Dicke | Sept. 7, 1948 |
| 2,727,154 | Goldsworthy | Dec. 13, 1955 |
| 2,822,479 | Goldsworthy | Feb. 4, 1958 |
| 2,829,264 | Garrison | Apr. 1, 1958 |
| 2,841,715 | Schultz | July 1, 1958 |
| 2,923,824 | Martin et al. | Feb. 2, 1960 |

FOREIGN PATENTS

| | | |
|---|---|---|
| 645,891 | Great Britain | Nov. 8, 1950 |